United States Patent [19]

Cook et al.

[11] 4,355,270

[45] Oct. 19, 1982

[54] MOTOR REVERSING CIRCUIT FOR VEHICLE WINDSHIELD WIPER

[75] Inventors: Keith R. Cook, Xenia; John E. Pozenel, Miamisburg; Donald E. Graham, Centerville, all of Ohio

[73] Assignee: General Motors Corporation, Detroit, Mich.

[21] Appl. No.: 326,801

[22] Filed: Dec. 2, 1981

[51] Int. Cl.³ .............................................. H02P 1/04
[52] U.S. Cl. ................................... 318/443; 318/444; 318/466; 318/467
[58] Field of Search ............... 318/443, 444, 466, 467, 318/281, 282, 267, 468, DIG. 2; 15/250.12, 250.13, 250.17

[56] References Cited

U.S. PATENT DOCUMENTS

| | | | |
|---|---|---|---|
| 3,617,837 | 11/1971 | Beck | 318/466 X |
| 3,689,817 | 9/1972 | Elliot | 318/443 |
| 3,927,436 | 12/1975 | Inoue et al. | 318/DIG. 2 X |
| 4,138,630 | 2/1979 | Graham | 318/282 X |
| 4,158,798 | 6/1979 | Holt | 318/444 |
| 4,223,256 | 9/1980 | Espenschied | 318/282 |
| 4,259,624 | 3/1981 | Seibicke | 318/282 |
| 4,271,381 | 6/1981 | Munz et al. | 318/282 |

FOREIGN PATENT DOCUMENTS 2039084  7/1980  United Kingdom ............... 318/443

*Primary Examiner*—Ulysses Weldon
*Attorney, Agent, or Firm*—Robert M. Sigler

[57] ABSTRACT

A motor reversing control circuit for a motor vehicle windshield wiper has a motor driven cam with a first lobe defining a park position for the wiper and a second lobe defining, in relation to the first, a wipe angle. A park switch is actuated by either lobe to reverse the output of a flip-flop which controls motor direction. The motor is activated in response to one or more of (a) a main switch, (b) the unactuated park switch and (c) the flip-flop output signalling wiper movement toward the park position. An optional timer effective to delay the motor activation in response to the main switch provides a pause in the park position.

5 Claims, 4 Drawing Figures

MOTOR REVERSING CIRCUIT FOR VEHICLE WINDSHIELD WIPER

BACKGROUND OF THE INVENTION

This invention relates to apparatus effective to automatically periodically reverse the operating direction of a windshield wiper motor to drive said windshield wiper repeatedly back and forth through a predetermined wipe angle and automatically stop it after a stop command in a predetermined park position.

In a traditional dual wiper front windshield wiper system, a single motor runs continuously in one direction; and back and forth wiping action is obtained therefrom through appropriate mechanical linkages. Such systems have been adequate and appropriate since a mechanical linking system is required anyway to drive two separate wipers from a single motor. However, with the increase in popularity of a single rear window mounted wiper, a mechanical direction reversing linkage is no longer desirable. With such a wiper, it is desirable to mount the wiper directly on the shaft of the motor or motor output gear box and periodically reverse direction of the motor itself to obtain back and forth wiping action. Various motor reversing control circuits have been proposed and used in the prior art, almost all of which have involved a complex and expensive system of limit switches to define the wipe angle limits during normal operation and further cause the wiper to stop in a park position when commanded. These limit switches introduce undesirable mechanical complexity and expense and, for the most part, greatly complicate the process of changing the wipe angle from one vehicle or application to another.

SUMMARY OF THE INVENTION

It is therefore an object of this invention to provide a motor reversing control apparatus for a vehicle windshield wiper motor which uses only a single position responsive switch of simple, inexpensive design and provides for easy, inexpensive change in wipe angle.

It is a further object of this invention to provide such an apparatus in which the park switch which already exists in traditional single direction motor control systems is utilized as the position responsive switch.

These and other objects are obtained in a windshield wiper motor drive apparatus for a motor vehicle comprising windshield wiper motor drive means, cam means driven by the drive means and having a first lobe defining a park position and a second lobe defining a wipe angle in relation to the first lobe, a park switch adapted for actuation by the cam lobes, drive control means responsive to each successive actuation of the park switch to reverse drive direction of the motor drive means and further being effective to generate a park signal while the drive means is in the park position, main switch means effective to activate the drive means and park drive control means effective when the main switch is deactivated to continue activation of the drive means only until the next simultaneous occurrence of an activation of the park switch and the existence of the park signal.

In this apparatus the park switch, which already exists in traditional windshield wiper motor control systems, is utilized as a limit switch in conjunction with a two lobed cam, where the two lobes of the cam provide the limits of the wipe angle and define the park position for the wiper. The cam may be manufactured inexpensively and a change from one cam to another is sufficient to change either the wipe angle or park position or both of the systems, with no other changes necessary.

Further details and advantages of this invention will be apparent from the accompanying drawings and following description of a preferred embodiment.

DESCRIPTION OF THE PREFERRED EMBODIMENT

Figure 1:
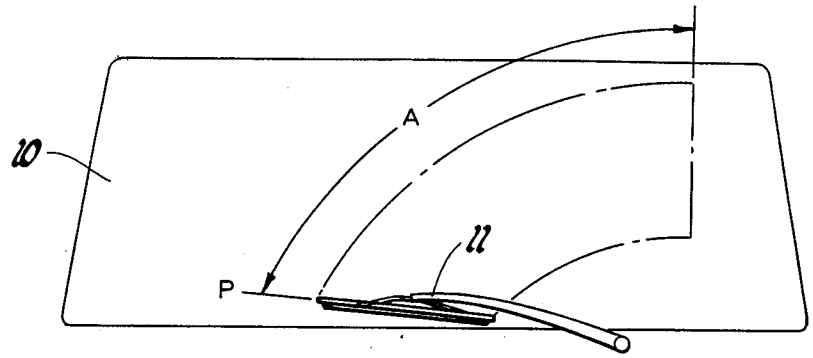
FIG. 1 shows a motor vehicle window with a windshield wiper adapted to sweep thereacross.

FIG. 1 shows a motor vehicle window 10 with a single windshield wiper adapted to clean a portion thereof by sweeping back and forth thereacross. A park position, defined by the letter P, is the normal position for windshield wiper 11 when the windshield wiper system is not in use. The letter A indicates the wipe angle of windshield wiper 11 when the windshield wiper system is activated; and the dashed lines show the area cleaned by the windshield wiper blade. The function of the motor control system for such a wiper is to cause back and forth movement of the wiper 11 through the angle A on a periodic basis until a deactivation command is received with subsequent return of the wiper to the park position P with no further wiping.

Figure 2:
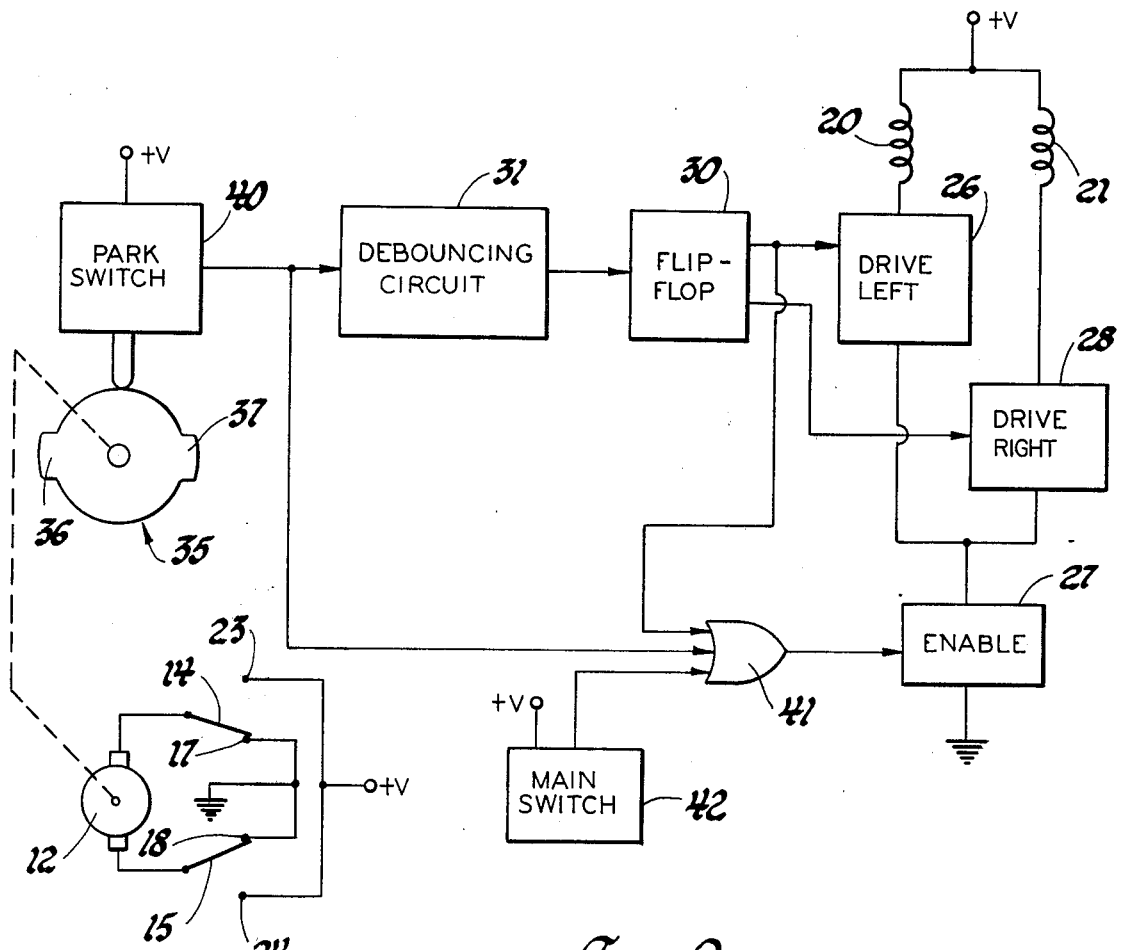
FIG. 2 shows a functional block diagram of a motor control circuit according to this invention.

FIG. 2 shows a windshield wiper motor control system effective to operate windshield wiper 11 of FIG. 1. A bidirectional, DC, permanent magnet motor 12 is adapted to receive armature current through a pair of relay armatures 14 and 15. Relay armatures 14 and 15 are normally biased toward grounded contacts 17 and 18, respectively, but may be alternately actuated by actuating coils 20 and 21, respectively, to engage contacts 23 and 24, respectively, for alternate connection to an electric power supply at voltage +V. Actuation of coil 20 results in rotation of motor 12 to drive windshield wiper 11 toward park position P; while actuation of coil 21 causes the opposite rotation of motor 12 to drive windshield wiper 11 away from the park position P. Coil 20 is actuated by the simultaneous closure of a drive left gate 26 and an enable gate 27 to complete an electrical circuit from the electrical power source at voltage +V to ground through coil 20. Likewise, coil 21, is actuated by the simultaneous closure of a drive right gate 28 and enable gate 27 to complete a similar circuit through coil 21. Drive right gate 28 and drive left gate 26 are alternately actuated in response to signals from a bistable memory means or flip-flop 30, which is connected so as to alternate its output each time it receives a triggering input pulse at an edge triggered input. These pulses are derived from a park switch 40 through a debouncing circuit 31 in a manner to be described below. Flip flop 30 has a first output to activate drive right gate 28 for wiper movement away from the park position and a second output to activate drive left gate 26 for wiper movement toward the park position.

In addition to wiper 11, motor 12 also drives a cam 35 having a pair of lobes 36 and 37, which are effective to actuate a park switch 40. Park switch 40 has a first, normally closed state but is actuated into a second, open state by either of cam lobes 36 and 37 so that a step voltage is applied through debouncing circuit 31, subject to the time delay of that circuit, to flip-flop 30. Thus, assuming enable gate 27 is enabled and flip-flop 30 is triggered by down-going edges, each actuation of park switch 40 by one of the cam lobes 36 and 37 provides a triggering pulse to flip-flop 30 to switch drive right gate 28 and drive left gate 26 to their opposite conditions and thus alternate the actuation of coils 20 and 21 to reverse the direction of motor 12. Contact bounce in switch 40 is eliminated by debouncing circuit 31; while noise actuation of flip-flop 30 is prevented by a choice of devices including Schmitt trigger circuitry for hysteresis.

Enable gate 27 is enabled from any of three sources through an OR gate 41. A main switch 42 is accessible to the vehicle operator and is effective, when in a closed or wipe state, to connect the electrical power source at voltage +V to one input of OR gate 41 and, when in an open or no wipe state, to disconnect such power. However, if this were the only enablement of enable gate 27, windshield wiper 11 would stop as soon as main switch 42 was opened by the vehicle operator, regardless of the wiper position. Since it is desired that the wiper 11 always return to its park position when main switch 42 is opened, two alternate enabling paths are provided.

The first alternate enabling path is from park switch 40 to another input of OR gate 41. This path enables enable gate 27 whenever park switch 40 is not actuated so that, if main switch 42 is opened while wiper 11 is not at one of its extreme positions, motor 12 will continue to be powered to drive wiper 11 in the same direction in which it was moving until park switch 40 is actuated.

If the wiper happens to be in the park position when this occurs, this control path is sufficient; however, if wiper 11 is in its opposite extreme position a further control path is provided from flip-flop 30 to another input of OR gate 41. This connection is so arranged that the second output from flip-flop 30, which activates coil 20 to move wiper 11 toward the park position, also enables enable gate 27. As soon as park switch 40 opens, therefore, flip-flop 30 changes its output to provide an enabling signal to enable gate 27 through OR gate 41. Upon return of the wiper 11 to its park position, park switch 40 opens and causes flip-flop 30 to provide a disabling signal to enable gate 27 so that power is withdrawn from motor 12 and wiper 11 stops in the park position. This disabling signal from flip-flop 30 comprises the park signal, since it is generated when park switch 40 is opened with wiper 11 in the park position.

Figure 3:
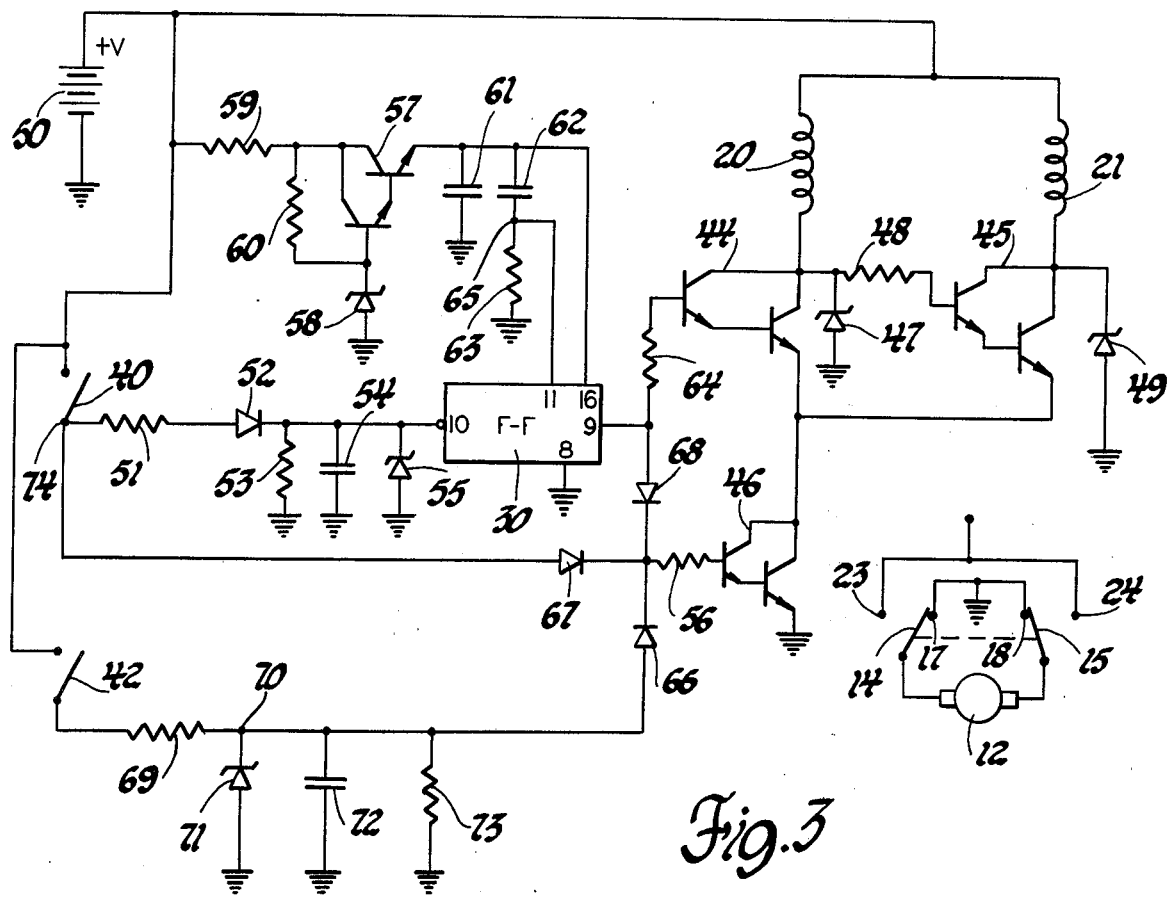
FIG. 3 shows a circuit diagram of a specific embodiment of the motor control circuit of FIG. 2.

FIG. 3 shows a particular circuit for accomplishing the functions of the system shown in FIG. 2. In FIG. 3, motor 12, relay components 14, 15, 17, 18, 23, 24, 20 and 21, as well as park switch 40 and main switch 42, are all identical with such components identified in FIG. 2. Drive left gate 26 and drive right gate 28 comprise Darlington transistors 44 and 45, respectively, which have collectors connected, respectively, to coils 20 and 21 and emitters connected to the collector of a grounded emitter Darlington transistor 46, which comprises enable gate 27. The collector of Darlington transistor 44 is further connected through a Zener diode 47 to ground and through a resistor 48 to the base of Darlington transistor 45, the collector of which is further connected through a Zener diode 49 to ground. The collectors of Darlington transistors 44 and 45 are further connected through coils 20 and 21, respectively, to the electric power source at voltage +V, which is symbolized by the positive side of battery 50, the negative side of which is grounded. This battery could be, for example, the normal vehicle battery with an alternator charging system.

The positive side of battery 50 is further connected through park switch 40, a resistor 51 and a diode 52 in series to a triggering input indicated as pin 10 of flip-flop 30. This input is further connected to ground through a resistor 53, capacitor 54 and Zener diode 55 in parallel. Input pin 10 of flip-flop 30 is a negative edge triggered input, which includes Schmitt trigger circuitry for hysteresis. Since park switch 40 is normally closed, Zener diode 55 maintains the voltage at pin 10 at a steady 6.2 volts until park switch 40 opens, at which time the voltage rapidly falls to the trigger level of pin 10. Capacitor 54 and resistor 53 comprise debouncing circuit 31 for a clean single trigger of the flip-flop.

Flip-flop 30 is grounded from pin 8 and provided with a regulated power voltage at pin 16 from the emitter of a Darlington transistor 57 having a base grounded through a Zener diode 58 and a collector connected to the positive side of battery 50 through a resistor 59 and back to its base through a resistor 60. The emitter of Darlington transistor 57 is further connected to ground through a capacitor 61. Zener diode 58, set at 8.6 volts, maintains a substantially constant voltage on the emitter of Darlington transistor 57, with any minor ripples smoothed by capacitor 61.

The emitter of Darlington transistor 57 is further connected through a capacitor 62 and resistor 63 in series to ground, with the junction 65 of capacitor 62 and resistor 63 connected to a reset input identified as pin 11 of flip-flop 30. Capacitor 62 and resistor 63 comprise a differentiating circuit to place flip-flop 30 in a low output condition on an output pin 9 when power is first applied to the system by the vehicle ignition switch, not shown. As described below, this guarantees that when the vehicle operator first closes the ignition switch of the vehicle and power is thereby applied to the circuit, the initial movement of the windshield wiper 11 upon the closure of main switch 42 will be away from the park position. The particular pin numbers shown for flip-flop 30 correspond to the first flip-flop of an MC 14040 twelve bit binary counter. However, any equivalent negative edge triggered Schmitt trigger input flip-flop could be used in its place.

Output pin 9 of flip-flop 30 is connected through a resistor 64 to the base of Darlington transistor 44. Thus, the first or low output of flip-flop 30 will cause Darlington transistor 44 to be turned off; and the high voltage at the collector thereof will turn Darlington transistor 45 on, with the small base current flow for Darlington transistor 45 through coil 20 being insufficient to activate armature 14. In this case, armature 15 will be actuated to turn motor 12 in a direction to move wiper 11 away from the park position P. However, the second or high output from flip-flop 30 at pin 9 causes Darlington transistor 44 to be turned on to provide actuating current through coil 20; and the low voltage at the collector of Darlington transistor 44 causes Darlington transistor 45 to turn off. Thus, armature 14 is actuated to drive motor 12 in the opposite direction and return wiper 11 to the park position P.

The three input circuits to enable gate 27 of FIG. 2 through OR gate 41 can be traced in the circuit of FIG. 3 through three parallel diodes 66, 67 and 68 and a resistor 56 to the base of Darlington transistor 46. The positive side of battery 50 is connected through main switch 42, resistors 69 and 56 and diode 66 in series to the base of Darlington transistor 46. The junction 70 of resistor 69 and diode 66 is connected to ground through the parallel combination of Zener diode 71, capacitor 72 and resistor 73. Thus, when main switch 42 is closed, a high voltage is provided through diode 66 to activate Darlington transistor 46. This voltage is limited to 8.6 volts by Zener diode 71 and smoothed by the RC combination of resistor 73 and capacitor 72.

The second path is a direct connection from the junction 74 of park switch 40 and resistor 51 through diode 67 and resistor 56 in series to the base of Darlington transistor 46. Thus, a high voltage will be provided through diode 67 to activate Darlington transistor 46 when park switch 40 is closed, as it normally is when not actuated by one of the cams 36 or 37.

Finally, the third path is a direct connection from output pin 9 of flip-flop 30 through diode 68 and resistor 56 to the base of Darlington transistor 46 so that the latter is actuated when flip-flop 30 has a high output: that is, when wiper 11 is moving toward park position P.

Figure 4:
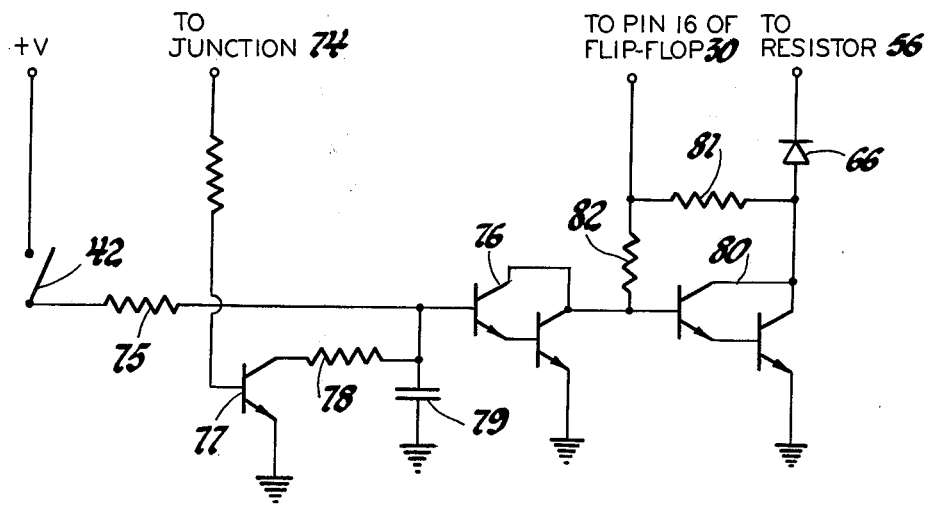
FIG. 4 is a circuit diagram of a modification of a portion of the specific embodiment shown in FIG. 3.

FIG. 4 shows a modification to a portion of the circuit of FIG. 3 which provides for a delaying pause for wiper 11 in the park position P between each wipe cycle. This circuit replaces the portion of the circuit of FIG. 3 between main switch 42 and diode 66. In the circuit of FIG. 4, the positive side of battery 50 at voltage +V is connected through switch 42 and a resistor 75 to the base of a Darlington transistor 76 having a grounded emitter. Junction 74 of FIG. 3 is further connected in FIG. 4 to the base of an NPN transistor 77 having a grounded emitter and a collector connected through a resistor 78 to the base of Darlington transistor 76, which is further connected through a capacitor 79 to ground. The collector of Darlington transistor 76 is connected to the base of a Darlington transistor 80 having a grounded emitter and a collector connected through diode 66 and resistor 56 in series to the base of Darlington transistor 46 of FIG. 3. Pin 16 of flip-flop 30 in FIG. 3 is further connected, in FIG. 4, through resistors 81 and 82 to the collector and base, respectively, of Darlington transistor 80.

In the operation of the circuit of FIG. 4, assume that main switch 42 is closed and wiper 11 is moving toward and nearing its park position P. In this situation, park switch 40 will be closed so that a high voltage will be applied to the base of transistor 77, thereby turning it on. Resistor 78 has a resistance which is very small in comparison with resistor 75, which includes the high resistance potentiometer, packaged in the main switch 42, by which the delay time of the system can be adjusted by the vehicle operator. Thus, the voltage on capacitor 79 at the base of Darlington transistor 76 is held close to ground, so that Darlington transistor 76 is turned off and Darlington transistor 80 is thus turned on. The collector of Darlington transistor 80 is thus near ground voltage so that no enabling signal is transmitted through diode 66 to the base of Darlington transistor 46. However, in this situation, Darlington transistor 46 is activated through park switch 40 and diode 67 in FIG. 3, as well as from pin 9 of flip-flop 30 through diode 68.

When wiper 11 reaches the park position P, park switch 40 is opened by cam 35 and transistor 77 is turned off. In addition, the enabling signal supplied to the base of Darlington transistor 46 through diode 67 is removed along with that from pin 9 of flip-flop 30 through diode 68. Wiper 11 thus remains in the park position while capacitor 79 in FIG. 4 charges through resistor 75. When the voltage on capacitor 79 reaches approximately 3.2 volts, Darlington transistor 76 turns on and Darlington transistor 80 turns off. At this point a high voltage is provided from the emitter of Darlington transistor 57 by way of pin 16 of flip-flop 30, resistor 81 and diode 66 to the base of Darlington transistor 46 to activate motor 12 and move wiper 11 away from its park position.

When wiper 11 reaches the opposite extreme position and park switch 40 again opens, the circuit of FIG. 4 operates initially in the same manner. However, in that case an enabling signal is provided by way of a high voltage from pin 9 of flip-flop 30 through diode 68 immediately after park switch 40 opens and removes the high voltage from diode 67, so that the wiper 11 does not pause at this end of its cycle. As soon as wiper 11 moves away from the extreme position and park switch 40 once again closes, capacitor 79 discharges quickly through resistor 78 so that it is once again in a discharged condition as wiper 11 again approaches the park position P.

When the vehicle operator opens main switch 42 to deactivate wiper 11, he removes the source of current necessary to charge capacitor 79 and thus guarantees that Darlington transistor 76 will remain off and Darlington transistor 80 will remain on. Therefore, no enabling voltage can be transmitted through diode 66 to the base of Darlington pair 46; and when the wiper 11 stops in the park position as described above, it will not start again.

Sample components and values for the circuits of FIGS. 3 and 4 follow:

| | |
|---|---|
| Darlingtons | 44, 45, 46, 57, 76, 80 - 2N5306 |
| transistor | 77 - MPS6513 |
| diodes | 47, 49 - 1N4750 |
| | 66, 67, 68 - 1N4004 |
| capacitors: | |
| | 54, 72 - 1 uFd |
| | 61, 79 - 22 uFd |
| | 62 - 0.1 uFd |
| resistors: | |
| | 48 - 2.2K |
| | 56, 64 - 22K |
| | 53, 60 - 3.3K |
| | 63 - 1 Meg |
| | 51 - 100 |
| | 69 - 200 |
| | 73 - 1500 |
| | 78 - 2K |
| | 81, 82 - 10K |

The embodiments of the invention in which an exclusive property or privilege is claimed are defined as follows:

1. Windshield wiper drive apparatus for a motor vehicle comprising, in combination:
   first means effective, when activated, to drive a windshield wiper across a motor vehicle window selectively toward or away from a predetermined park position;
   cam means driven by said first means with the windshield wiper, said cam means having a first lobe defining said park position and a second lobe defining, with said first lobe, a wipe angle for said wiper;
   a park switch adapted for actuation by said cam lobes;

second means responsive to each successive actuation of the park switch to reverse the drive direction of said first means, said second means being effective to generate a park signal when the drive direction is reversed away from the park position;

main switch means effective, while activated, to activate said first means; and third means effective, when the main switch means is deactivated, to continue activation of the first means only until the next simultaneous concurrence of an actuation of the park switch and the existence of the park signal, whereby the wiper is oscillated through the predetermined angle while the main switch means is activated and then automatically returned to the park position.

2. Windshield wiper drive apparatus for a motor vehicle comprising, in combination:

first means effective, when activated, to drive a windshield wiper across a motor vehicle window selectively toward or away from a predetermined park position;

cam means driven by said first means with the windshield wiper, said cam means having a first lobe defining said park position and a second lobe defining, with said first lobe, a wipe angle for said wiper;

a park switch adapted for actuation by said cam lobes;

bistable memory means having an output effective to control the drive direction of the drive means and being responsive to each successive actuation of the park switch to reverse said output and thus the drive direction of said first means, said bistable memory means being effective to generate a park signal when the output reverses to cause the wiper to be driven away from the park position;

main switch means effective, while activated, to activate said first means; and third means responsive to the unactuated park switch or the absence of the park signal from the bistable memory means to continue activation of the first means when the main switch means is not activated, whereby the wiper is oscillated through the predetermined angle while the main switch means is activated and then automatically returned to the park position.

3. Windshield wiper drive apparatus for a motor vehicle comprising, in combination:

first means effective, when activated, to drive a windshield wiper across a motor vehicle window selectively toward or away from a predetermined park position;

cam means driven by said first means with the windshield wiper, said cam means having a first lobe defining said park position and a second lobe defining, with said first lobe, a wipe angle for said wiper;

a park switch adapted for actuation by said cam lobes;

second means responsive to each successive actuation of the park switch to reverse the drive direction of said first means, said second means being effective to generate a park signal while the drive direction is away from the park position;

third means responsive to the unactuated park switch or the absence of the park signal to activate the first means;

timer means triggered by the actuation of the park switch and effective when triggered and in the absence of the park signal to activate the first means after a predetermined time interval; and main switch means effective, only when not activated, to prevent activation of the first means by the timer means, whereby the wiper is oscillated through the predetermined angle with a pause in the park position while the main switch means is activated and automatically returned to the park position when the main switch is deactivated.

4. Windshield wiper drive apparatus for a motor vehicle comprising, in combination:

a bidirectional DC motor effective to drive a windshield wiper across a motor vehicle window selectively to or away from a park position;

a cam driven by said motor with the windshield wiper and having a first lobe defining the park position and a second lobe defining, in relation to the first, a wipe angle for the wiper;

a park switch normally in a first state but adapted for actuation into a second state by said cam lobes with rotation of the cam;

a flip-flop having first and second output states and responsive to each actuation of the park switch to its second state to switch its own output state from said first or second to the opposite;

first circuit means effective, when enabled, to provide power to the motor for rotation of the wiper away from the park position in response to the first flip-flop output state and to provide power to the motor for rotation of the wiper toward the park position in response to the second flip-flop output state;

a main switch having wipe and no wipe states;

second circuit means effective to enable the first circuit means in response to any one or more of (a) the wipe state of the main switch, (b) the first state of the park switch and (c) the second flip-flop output state; and means effective to initialize the flip-flop in its first output state, whereby the wiper is responsive to the main switch in its wipe state to oscillate through the wipe angle and to the main switch in its no wipe state to continue to the park position and stop.

5. Windshield wiper drive apparatus for a motor vehicle comprising, in combination:

a bidirectional DC motor effective to drive a windshield wiper across a motor vehicle window selectively to or away from a park position;

a cam driven by said motor with the windshield wiper and having a first lobe defining the park position and a second lobe defining, in relation to the first, a wipe angle for the wiper;

a park switch normally in a first state but adapted for actuation into a second state by said cam lobes with rotation of the cam;

a flip-flop having first and second output states and responsive to each actuation of the park switch to its second state to switch its own output state from said first or second to the opposite;

first circuit means effective, when enabled, to provide power to the motor for rotation of the wiper away from the park position in response to the first flip-flop output state and to provide power to the motor for rotation of the wiper toward the park position in response to the second flip-flop output state;

a main switch having wipe and no wipe states;

an RC timer effective to be reset in response to the first state of the park switch and triggered, only when the main switch is in its wipe state, by the second state of the park switch, the RC timer being effective when triggered, until it is reset, to generate a continuous enable signal beginning a predetermined time duration after said triggering;

second circuit means effective to enable the first circuit means in response to any one or more of (a) the first state of the park switch, (b) the second flip-flop output state and (c) the enable signal of the timer; and means effective to initialize the flip-flop in its first output state, whereby the wiper is responsive to the main switch to oscillate through the wipe angle with a pause in the park position and to the main switch in its no wipe state to continue to the park position and stop.

* * * * *